United States Patent [19]

Dice, Sr.

[11] E Patent Number: Re. 31,791

[45] Reissued Date of Patent: Jan. 8, 1985

[54] PICK-PROOF LOCK

[75] Inventor: Harry E. Dice, Sr., Edgewater, Md.

[73] Assignee: George K. C. Hardesty, Mayo, Md. ; a part interest

[21] Appl. No.: 212,107

[22] Filed: Dec. 2, 1980

Related U.S. Patent Documents

Reissue of:

[64] Patent No.: 4,194,379
Issued: Mar. 25, 1980
Appl. No.: 895,708
Filed: Apr. 12, 1978

[51] Int. Cl.[3] ..... E05B 63/00

[52] U.S. Cl. ..... 70/421

[58] Field of Search ..... 70/421, 419, 416, 364 A, 70/373

[56] References Cited

U.S. PATENT DOCUMENTS

| | | | |
|---|---|---|---|
| 3,216,230 | 11/1965 | Falk | 70/421 |
| 3,455,130 | 7/1969 | Basseches | 70/421 |
| 3,494,157 | 2/1970 | Coker | 70/27 C |
| 3,670,540 | 6/1972 | Fernandez | 70/421 |
| 3,938,358 | 2/1976 | Doyle | 70/358 |
| 3,990,281 | 11/1976 | Meder | 70/364 A |

*Primary Examiner*—Robert L. Wolfe

*Attorney, Agent, or Firm*—Birch, Stewart, Kolasch & Birch

[57] ABSTRACT

A pick-proof lock of the cylinder type primarily intended for use in doors, which includes a locking collar or sleeve slidably mounted around a portion of the cylinder plug and which contains a notch to receive a spring pressed pin which is contained in the cylindrical shell of the lock. The collar or sleeve is slidably and rotatively received in the shell and spring pressed for engagement of its notch with the pin, whereby rotation of the plug within the shell can only be accomplished to effect unlocking of the lock when the spring urged locking collar has been displaced rearwardly of the lock from a projected locking position to a retracted unlocking position. Since the locking collar and the pin which locks said collar to the shell do not communicate with the keyway of the plug, tools and other instruments normally used for picking locks are ineffective in picking the lock.

11 Claims, 5 Drawing Figures

FIG. 1
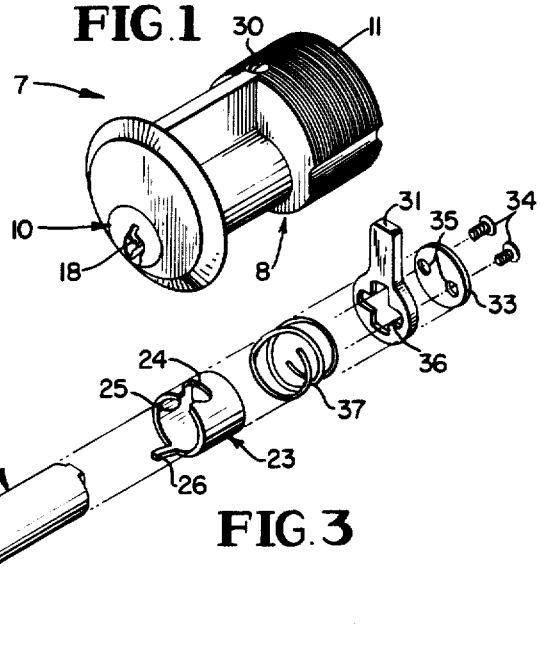
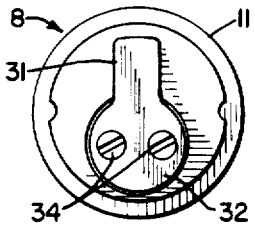
FIG. 2
FIG. 3
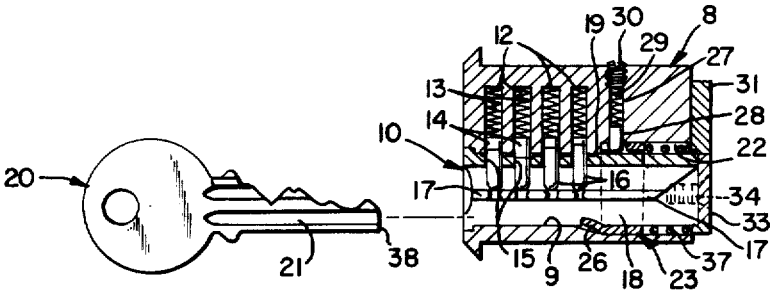
FIG. 4
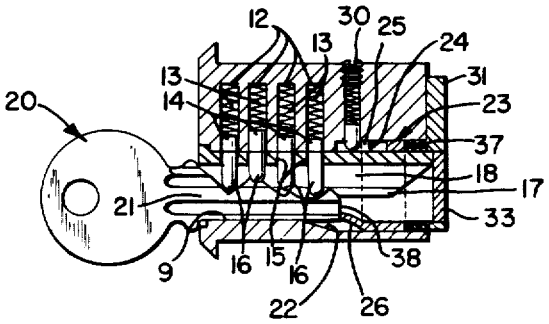
FIG. 5

PICK-PROOF LOCK

Matter enclosed in heavy brackets [ ] appears in the original patent but forms no part of this reissue specification; matter printed in italics indicates the additions made by reissue.

SUMMARY

It is a primary object of the present invention to provide a lock cylinder which can be readily substituted for a conventional lock cylinder in the lock of a door to provide a door locking means which will effectively resist tampering.

Another object of the invention is to provide a cylinder-type lock including an auxiliary locking means carried by and disposed externally of the lock plug and which engages a spring pressed pin which is not accessible from the keyway of the plug, so that conventional picking instruments and tools cannot be utilized for picking the lock.

A further object of the invention is to provide a cylinder-type lock of simple construction capable of being economically manufactured, which will be efficient and durable in use for accomplishing its intended purpose, and which does not require a uniquely constructed key for unlocking the lock.

Various other objects and advantages of the invention will hereinafter become more fully apparent from the following description of the drawing, illustrating a presently preferred embodiment thereof, and wherein:

BRIEF DESCRIPTION OF THE DRAWING

FIG. 1 is a perspective view of the lock looking toward the front end thereof;

FIG. 2 is an end view in elevation, looking toward the rear end of the lock;

FIG. 3 is an exploded perspective view of the lock plug and certain of the parts normally carried thereby;

FIG. 4 is a longitudinal substantially central sectional view of the lock in a locked position with the key removed, and FIG. 5 is a similar view with the key applied for unlocking the lock.

DESCRIPTION OF THE PREFERRED EMBODIMENT

Referring more specifically to the drawing, the cylinder lock cylinder in its entirety is designated generally 7 and includes a cylindrical shell 8 having an off-center bore 9 extending longitudinally therethrough for receiving a cylinder plug 10 which is mounted rotatively therein. The shell 8 has an externally threaded portion 11 to enable it to be threadedly mounted in a conventional cylinder housing, not shown, of a door.

The shell 8 is provided with radially extending sockets 12 each containing a compression spring 13 which seats against the closed end of the socket and which yieldably urges a pin tumbler 14 into the bore 9. The plug 10 has bores 15 to align with the sockets 12 and which slidably receive pin tumblers 16. The inner ends of the pin tumblers 16 seat on a longitudinal rib 17 disposed in the keyway 18 of the plug 10 for supporting the aligned pin tumblers 14 and 16 with their abutting ends out of registration with the space 19 between the bore 9 and the periphery of the plug 10, known as the "shear line". With the pin tumblers thus disposed as seen in FIG. 4, the plug 10 is held against rotation in the shell 8 so that the lock 7 is in a locked condition.

A key 20 has a blade 21 one edge of which is notched to provide ribs and grooves to enngage the pin tumblers 16 when the key 20 is fully inserted in the keyway 18, as seen in FIG. 5, for positioning the pin tumblers 16 so that their outer ends and the inner ends of the pin tumblers 14, against which said outer ends abut, will be in the plane of the "shear line" 19, as is conventional. This would normally permit the key 20 to turn the plug 10 in the shell 8, as is conventional, in a cylinder lock; however, novel features of the lock 8, nnow to be described, prevent the plug 10 from rotating with the key 20 merely because said key is disposed, as seen in FIG. 5.

The bore 9 has an enlarged inner end 22 to accommodate a locking sleeve or collar 23 which is slidably mounted in said bore 22 and slidably engages on the plug 10. As best seen in FIG. 3, the collar 23 includes a notch 24 having a restricted end portion 25 which opens outwardly of a forward end of said collar. A finger 26 which is disposed substantially diametrically opposite to the restricted notch opening 25 extends from said forward end of the collar 23 and is bent inwardly of the axis of said collar, so that said finger 26 extends into the keyway 18 for keying collar 23 to the plug 10 to permit only very limited rotation of the collar relative to the plug.

The shell 8 has a bore 27 extending from a part of its periphery into the bore 22. A pin 28 engages slidably in the inner end of the bore 27 and is urged inwardly by a compression spring 29. The outer end of the spring 29 seats against a plug 30 which is threaded into the outer end of the bore 27. The pin 28 engages normally in the enlarged inner portion of the notch 24 to prevent the collar 23 and plug 10 from rotating in the shell 8 even though the pin tumblers 14 and 16 are disposed, as seen in FIG. 5.

A cam or trigger 31, which is recessed as seen at 32 to accommodate a disc 33, is secured to the rear end of the plug 10 by screws 34 which extend through openings 35 of the disc 33 and through an opening 36 of the cam 31 and which are threaded into said rear end of the plug 10. The cam or trigger 31 which normally functions to accomplish the unlocking of the door or closure when rotated with the plug 10, additionally functions as a stop or abutment for a compression spring 37 which is mounted on the plug 10, in the bore portion 22, between the other rear end of the collar 23 and said cam or trigger 31. Thus, the spring 27 functions to normally thrust collar 23 to a forward position, as seen in FIG. 4, with its notch 24 engaging the pin 28.

As seen in FIGS. 3 and 4, unlike conventional keys the blades of which are tapered at their leading ends, the blade 21 has a blunt leading end 38 which strikes the finger 26 as said key approaches its position of FIG. 5 in the keyway 18 for displacing the collar 23 toward the cam 31 and to its position of FIG. 5, as the key 20 reaches its fully inserted position, for disengaging the notch 24 from the pin 28, so that the key 20 can turn the plug 10 to accomplish the unlocking operation.

However, it will be readily apparent that a tool or instrument, not shown, such as is normally used for picking a cylinder lock will not be effective in picking that lock 7 since the pin 28 is not accessible to such a tool. Further, lock picking tools are normally utilized successively on the pin tumblers from the front or entrance end of the keyway. It will be noted that the finger 26 is disposed directly beneath the innermost pin tumbler 16 so that a picking tool, not shown, after picking this pin tumbler will be beyond the finger 26 and seeking another pin tumbler.

Various modifications and changes are contemplated and may be resorted to without departing from the function or scope of the invention.

I claim as my invention:

1. A key operated lock cylinder including a shell having a longitudinally extending bore, a cylinder plug rotatively mounted in said bore, said shell having longitudinally spaced parallel sockets opening into said bore, spring pressed pin tumblers slidably mounted in said sockets, said plug having a keyway and being provided with radial bores opening into said keyway and outwardly of the plug periphery for alignment with said sockets in one position of rotation of the plug, pin tumblers slidably mounted in said plug bores and extending into the keyway and abutting the pin tumblers of the shell; said shell bore being enlarged beyond an innermost one of said sockets, a rotation limiting pin mounted radially in said shell and extending into said enlarged bore portion in close proximity to a part of the periphery of the plug, a collar slidably mounted on said plug within said enlarged bore portion and having a notch opening outwardly of the forward end thereof in which said rotation limiting pin is received, a compression spring carried by the plug within said enlarged bore portion and bearing against and urging the collar in a forward direction, said collar having a finger projecting into the keyway for non-rotatably connecting the collar to the plug, and a key having a blade notched to cause the pin tumblers to assume unlocked positions and having a forward end for engaging said finger to move said collar rearwardly and out of engagement with the pin to permit the key to rotate the plug within the shell to effect unlocking of the lock.

2. A key operated lock cylinder as in claim 1, a cam secured to the rear end of the plug and disposed against the rear end of the shell, said cam providing an abutment for the rear end of said compression spring.

3. A key operated lock cylinder as in claim 1, said notch having a circumferentially enlarged inner portion and a restricted outer portion opening through the front edge of the collar.

4. A key operated lock cylinder as in claim 1, said forward end of the key being blunt to engage the forward end of the finger.

5. A key operated lock cylinder as in claim 1, the forward end of said finger being disposed substantially in alignment with the innermost pin tumbler.

*6. A key operated lock cylinder comprising:*

*a shell having a longitudinally extending bore;*

*a plug rotatively mounted in said bore having a keyway including an opening for insertion of a key, said plug having a locked position and an unlocked position;*

*locking means for restraining said plug in said locked position, said locking means being released when a key corresponding to said locking means is fully inserted into said keyway;*

*a rotation-limiting pin;*

*restraining notch means in a labyrinth means operatively associated with said rotation limiting pin to prevent rotation of said plug to said unlocked position;*

*resilient means for biasing engagement of said pin and labyrinth means to normally hold said rotation limiting pin in said restraining notch means;*

*said corresponding key displacing the relative positions of said pin and restraining notch means longitudinally of said bore, when said key is fully inserted, so that said pin is out of said restraining notch means and said labyrinth means to allow said plug to rotate to said unlocked position;*

*said labyrinth means having an enlarged portion constituting said restraining notch means, a restricted end portion, and an opening, said restricted end portion being located near the opening of said labyrinth means, said enlarged portion allowing a limited rotation of said plug when said locking means is released, said restricted end portion preventing the movement of said pin out of said labyrinth means unless said plug is positioned in said locked position.*

*7. The lock cylinder of claim 6, wherein said rotation limiting pin is radially mounted in said shell; and*

*a collar is slidably mounted in said shell and operatively coupled to rotate with said plug, said labyrinth means being formed in said collar.*

*8. The lock cylinder of claim 7, wherein said labyrinth means is positioned on the edge of said collar nearest the opening of said keyway.*

*9. The lock cylinder of claim 7, wherein said collar further includes a trigger means positioned such that the end of said corresponding key will strike said trigger means to slide said collar, thereby disengaging said labyrinth means from said pin.*

*10. The lock cylinder of claim 9, wherein said trigger means is a finger projecting into said keyway from the edge of said collar nearest the opening of said keyway.*

*11. The lock cylinder of claim 6, further comprising:*

*a trigger assembly disposed inside said plug and operatively connected to said collar, said trigger assembly having a trigger formed on the end portion of said trigger assembly nearest the opening of said keyway;*

*said trigger being positioned such that the end of the corresponding key will strike said trigger to slide said trigger assembly and said collar longitudinally of said bore, thereby disengaging said restraining notch means from said pin.*

* * * * *